(12) United States Patent
Ko et al.

(10) Patent No.: US 12,314,568 B2
(45) Date of Patent: May 27, 2025

(54) MEMORY CONTROLLER, METHOD OF OPERATING THE MEMORY CONTROLLER, AND STORAGE DEVICE INCLUDING THE MEMORY CONTROLLER

(71) Applicant: SAMSUNG ELECTRONICS CO., LTD., Suwon-si (KR)

(72) Inventors: Minseok Ko, Suwon-si (KR); Jaewook Kwak, Suwon-si (KR); Minwook Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/221,623

(22) Filed: Jul. 13, 2023

(65) Prior Publication Data

US 2024/0231631 A1    Jul. 11, 2024

(30) Foreign Application Priority Data

Jan. 9, 2023    (KR) .......................... 10-2023-0002853

(51) Int. Cl.
*G06F 3/00* (2006.01)
*G06F 3/06* (2006.01)

(52) U.S. Cl.
CPC .......... *G06F 3/0613* (2013.01); *G06F 3/0656* (2013.01); *G06F 3/0659* (2013.01); *G06F 3/0679* (2013.01)

(58) Field of Classification Search
CPC .... G06F 3/0613; G06F 3/0656; G06F 3/0659; G06F 3/0679
See application file for complete search history.

(56) References Cited

U.S. PATENT DOCUMENTS

| 8,984,216 | B2 | 3/2015 | Fillingim |
| 10,824,564 | B2 | 11/2020 | Jun et al. |
| 10,877,667 | B2 | 12/2020 | Karia et al. |
| 11,099,773 | B1 | 8/2021 | Kryvaltsevich |
| 11,309,040 | B2 | 4/2022 | Blodgett et al. |
| 11,455,107 | B2 | 9/2022 | Rajgopal et al. |
| 11,468,952 | B2 | 10/2022 | Kim et al. |
| 2012/0066439 | A1* | 3/2012 | Fillingim ............. G06F 3/0653 711/E12.008 |
| 2018/0121372 | A1* | 5/2018 | Lyon ...................... G06F 21/85 |
| 2019/0205244 | A1* | 7/2019 | Smith .................... G06F 3/065 |
| 2022/0269435 | A1 | 8/2022 | Yoon |

FOREIGN PATENT DOCUMENTS

KR    10-2022-0033784 A    3/2022

* cited by examiner

*Primary Examiner* — Craig S Goldschmidt
(74) *Attorney, Agent, or Firm* — Sughrue Mion, PLLC

(57) ABSTRACT

A method of operating a memory controller is provided. The method includes: receiving a write request from a host; determining whether to inactivate a throttling operation based on whether the write request corresponds to a throttling disable word line and whether a memory block corresponding to the write request needs to be erased; and performing a write operation corresponding to the write request based on the determining.

20 Claims, 12 Drawing Sheets

MEMORY CONTROLLER, METHOD OF OPERATING THE MEMORY CONTROLLER, AND STORAGE DEVICE INCLUDING THE MEMORY CONTROLLER

CROSS-REFERENCE TO RELATED APPLICATION

This application is based on and claims priority under 35 U.S.C. § 119 to Korean Patent Application No. 10-2023-0002853, filed on Jan. 9, 2023, in the Korean Intellectual Property Office, the disclosure of which is incorporated by reference herein in its entirety.

BACKGROUND

The present disclosure relates to a memory controller, and more particularly, to a memory controller controlling a throttling operation, a method of operating the memory controller, and a storage device including the memory controller.

As a measure of performance of a storage device, an input/output bandwidth may be cited as an example. The input/output bandwidth of a storage device may not be constant. To provide a consistent speed of the input/output bandwidth, the storage device may be configured to have a stable bandwidth by limiting the input/output bandwidth to a certain level using throttling. However, specific operations may cause the storage device to operate at a lower speed than a speed limited through throttling, resulting in a drop in bandwidth of the storage device.

SUMMARY

The present disclosure provides a storage device having improved performance by enabling the storage device to have a further consistent bandwidth by controlling a throttling operation through a memory controller.

Technical problems to be solved by example embodiments are not limited to the problems mentioned above, and other problems not mentioned will be clearly understood by those skilled in the art from the description below.

According to an aspect of an example embodiment, a method of operating a memory controller includes: receiving a write request from a host; determining whether to inactivate a throttling operation based on whether the write request corresponds to a throttling disable word line and whether a memory block corresponding to the write request needs to be erased; and performing a write operation corresponding to the write request based on the determining.

According to an aspect of an example embodiment, a memory controller includes: a processor configured to control: a command manager to receive a write request from a host; a write manager to determine whether to inactivate a throttling operation based on whether the write request corresponds to a throttling disable word line and whether a memory block corresponding to the write request needs to be erased; and control a write operation corresponding to the write request based on whether the write manager determines to inactivate the throttling operation.

According to an aspect of an example embodiment, a storage device includes: a memory device including a plurality of memory blocks; and a memory controller configured to receive a write request from a host, determine whether to inactivate a throttling operation based on whether the write request corresponds to a throttling disable word line and whether a memory block corresponding to the write request needs to be erased, and perform a write operation corresponding to the write request based on whether it is determined to inactivate the throttling operation.

BRIEF DESCRIPTION OF DRAWINGS

Embodiments will be more clearly understood from the following description of example embodiments, taken in conjunction with the accompanying drawings in which.

DETAILED DESCRIPTION

Figure 1:
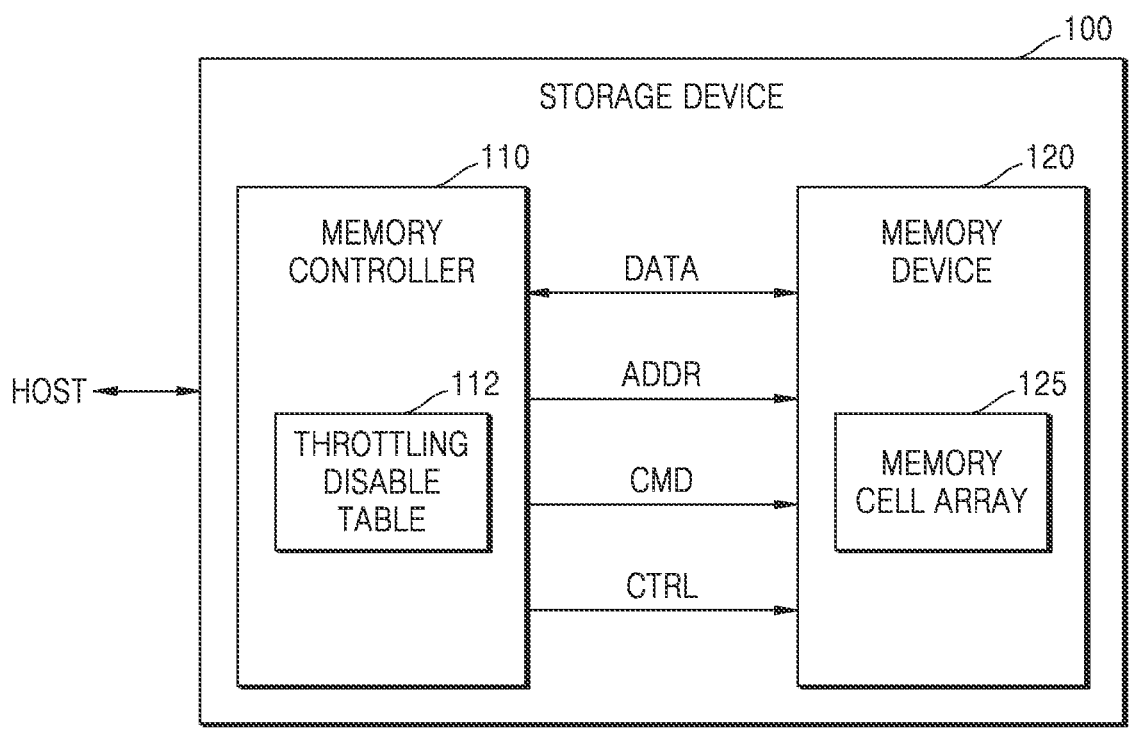
FIG. 1 is a block diagram illustrating a storage device according to an example embodiment.

Hereinafter, example embodiments will be described in detail with reference to the accompanying drawings. Like reference numerals are used to indicate the same or corresponding components and overlapping descriptions thereof are omitted.

FIG. 1 is a block diagram illustrating a storage device 100 according to an example embodiment.

Referring to FIG. 1, the storage device 100 may include a memory controller 110 and a memory device 120. The memory controller 110 may include a throttling disable table 112.

In some example embodiments, the storage device 100 may be implemented as an internal memory embedded in an electronic device, for example, an embedded Universal Flash Storage (UFS) memory device, an embedded Multi-Media Card (eMMC), or a Solid State Drive (SSD). In some example embodiments, the storage device 100 may be implemented as an external memory detachable from an electronic device, for example, a UFS memory card, a Compact Flash (CF) card, a Secure Digital (SD) card, a Micro Secure Digital (Micro-SD) card, a Mini Secure Digital (Mini-SD) card, an extreme Digital (xD) card, or a Memory Stick.

The memory controller 110 may control the memory device 120 so that the memory device 120 reads data stored in the memory device 120 or writes data to the memory device 120 in response to a read/write request from a host HOST. Specifically, the memory controller 110 controls write, read, and erase operations of the memory device 120 by providing an address ADDR, a command CMD, and a control signal CTRL to the memory device 120. Also, data DATA for programming and read data DATA may be transmitted and received between the memory controller 110 and the memory device 120.

The memory device 120 may include a memory cell array 125. The memory cell array 125 may include a plurality of memory cells, for example, the plurality of memory cells may be flash memory cells. The memory cell array 125 may include a plurality of cell strings (or NAND strings) respectively connected to points where a plurality of string select lines and a plurality of bit lines cross each other, and each cell string may include a plurality of memory cells. For example, the cell string may be implemented to extend in a direction perpendicular to a semiconductor substrate, and thus, each cell string may include a plurality of memory cells positioned vertically with respect to the semiconductor substrate. Memory cells included in the cell strings may be connected to a plurality of word lines. Each of the plurality of word lines may correspond to memory pages. Hereinafter, a memory page may be referred to as a page.

In an example embodiment, the memory device 120 may include a single memory chip. As another example, the memory device 120 may include a plurality of memory chips. One memory chip may be configured of a single die or a plurality of dies. A single die may be configured of a single plane or multiple planes. One plane may include a plurality of memory blocks, each of the memory blocks may include a plurality of pages, and each of the pages may include a plurality of sectors.

Performance of the storage device 100 may be indicated by, for example, throughput, input/output operations per second (IOPS), or bandwidth. Hereinafter, bandwidth is described as an example of a measure of performance of the storage device 100. Bandwidth is described as an example, and the bandwidth may be described in terms of throughput or IOPS.

The bandwidth of the storage device 100 may be adjusted through a throttling operation. For example, when the bandwidth of the storage device 100 is not constant, the bandwidth may be kept constant by preventing the bandwidth from exceeding a throttling level through a throttling operation, and in this way, a response according to an input/output request may be stably provided to the host HOST. Hereinafter, it is assumed that the storage device 100 operates in a state in which a throttling operation is performed unless it is determined to inactivate throttling. For example, the storage device 100 may operate, by default, in the state in which the throttling operation is performed. The storage device 100 may inactivate the throttling operation.

The storage device 100 according to an example embodiment may inactivate the throttling operation according to a specific condition, and may maintain a consistent bandwidth by restarting the throttling operation when the specific condition ends (i.e., is resolved). Accordingly, the storage device 100 may stably provide data to the host HOST and may stably process requests from the host HOST. Hereinafter, that the storage device 100 performs a throttling operation may denote that the memory controller 110 controls a bandwidth of the storage device 100 by setting a throttling level so that the bandwidth of the storage device 100 does not exceed the throttling level. In addition, that the storage device 100 inactivates the throttling operation may denote that the memory controller 110 increases the throttling level to have a level higher than the currently set level or controls the bandwidth of the storage device 100 by inactivating the throttling level so that the bandwidth of the operation of the storage device 100 exceeds the throttling level. That is, in this case, the bandwidth of the storage device 100 may not be limited to the throttling level.

Some specific operations may cause the bandwidth of the storage device 100 to significantly decrease. Correspondingly, in processing a request of the host HOST, the memory controller 110 may inactivate the throttling operation before a point at which the bandwidth of the storage device 100 is expected to significantly decrease, and in this way, the decrease in the bandwidth of the storage device 100 may be mitigated. That is, the storage device 100 may process a request of the host HOST with a more constant bandwidth even if an operation of reducing the bandwidth is performed.

In an example embodiment, one of the specific operations causing a large reduction in bandwidth of the storage device 100 may be an erase operation that is performed before writing of the storage device 100. When the storage device 100 performs a write operation on a specific memory block of the memory device 120 according to a write request from the host HOST, an erase operation may precede the write operation. For example, when an erase operation is performed before writing to a first memory block, the bandwidth of the storage device 100 may significantly decrease. Accordingly, the memory controller 110 may inactivate a throttling level at a first time point before the erase operation, write to the first memory block, and reset the throttling level at a second time point when the erase operation and the write operation are completed. Through this operation, the storage device 100 may have more consistent bandwidth in a time period between the first time point and the second time point.

In an example embodiment, another one of the specific operations causing a large reduction in bandwidth of the storage device 100 may be a write operation that is performed for a specific word line determined to reduce performance of the storage device 100. The memory cell array 125 may include a plurality of word lines. However, due to a problem in a semiconductor process, bandwidths in performing a write/read operation on each word line may be different. For example, in writing a value "A" into the memory cell array 125, a bandwidth when writing on a first word line and a bandwidth when writing on a second word line may be different from each other. That is, when a write/read operation is performed on a specific word line, the bandwidth may change irregularly, and as a result, inconsistent service may be provided to the user. Hereinafter, among a plurality of word lines included in the memory cell array 125, word lines which a bandwidth is measured below a reference value may be referred to as throttling disable word lines. In this case, the reference value may be a value pre-input into the storage device 100, and may be, for example, an average value of bandwidths. Information indicating the throttling-disable word lines may be stored in a throttling disable table 112.

Figure 2:
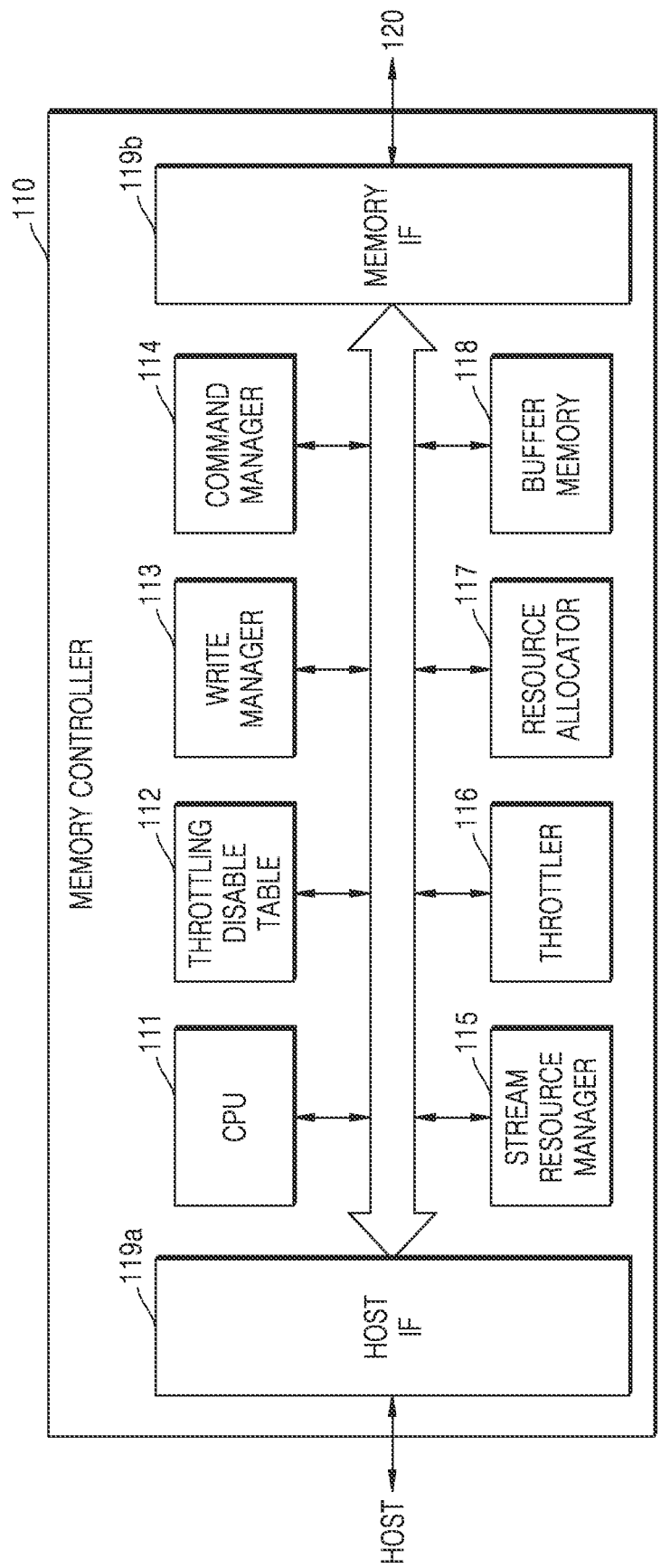
FIG. 2 is a block diagram illustrating a memory controller according to an example embodiment.

FIG. 2 is a block diagram illustrating the memory controller 110 according to an example embodiment. FIG. 2 will be described with reference to FIG. 1, and descriptions already given may be omitted.

The memory controller 110 includes a central processing unit (CPU) 111, a throttling disable table 112, a write manager 113, a command manager 114, a stream resource manager 115, a throttler 116, a resource allocator 117, a buffer memory 118, a host interface 119a, and a memory interface 119b. In an example embodiment, the throttling disable table 112, the write manager 113, the command manager 114, the stream resource manager 115, the throttler 116, and resource allocator 117 may be implemented as hardware, software or a combination of hardware and software.

The CPU 111 may control all operations of the storage device 100. Specifically, the CPU 111 may control the storage device 100 to decode a command received from the host HOST and perform an operation according to the decoded result. The CPU 111 may execute firmware loaded into Read Only Memory (ROM) of the memory controller 110 to perform garbage collection, address mapping, wear leveling, etc., for managing the memory device 120 (refer to FIG. 1).

The throttling disable table 112 may include information indicating a throttling disable word line. The information indicating the throttling disable word line may refer to information about throttling disable word lines identified when a product is manufactured through a semiconductor process.

The write manager 113 may control all write operations for the memory device 120. In an example embodiment, the write manager 113 may inactivate a throttling operation when a write operation is performed on a specific word line based on word line information included in the throttling disable table 112. In an example embodiment, when an erase operation is performed before writing to a specific memory block, the write manager 113 may prevent the throttling operation from being performed by adjusting a throttling level before the erase operation is performed.

The command manager 114 may receive write requests from the host HOST. The command manager 114 may be referred to as an IPC manager. In an example embodiment, the write manager 113 may pass a request signal to the command manager 114. The write manager 113 may receive write requests transmitted from the host HOST from the command manager 114.

The stream resource manager 115 may receive a logical address of a memory page on which a write operation is to be performed from the write manager 113. The stream resource manager 115 may transfer a physical address of the memory page corresponding to the received logical address to the write manager 113. In an example embodiment, the stream resource manager 115 may include a mapping table including mapping information of a logical address and a physical address.

The throttler 116 may adjust a bandwidth when data is written into the memory device 120 by adjusting a throttling level. In an example embodiment, the throttler 116 may receive a throttling disable signal from the write manager 113 and may inactivate the throttling level in response to the received throttling disable signal. In addition, the throttler 116 may receive a throttling resume signal from the write manager 113 and may reset the throttling level in response to the throttling resume signal. In an example embodiment, the throttler 116 may be referred to as an Input/Output Throttler.

The resource allocator 117 may allocate a buffer memory to be used when the write manager 113 performs a write operation when the memory controller 110 includes a plurality of buffer memories. This is described below with reference to FIG. 5.

The buffer memory 118 may temporarily store data to be written to the memory device 120 or data read from the memory device 120. The buffer memory 118 may include at least one of Dynamic Random Access Memory (DRAM) and Static Random Access Memory (SRAM). In an example embodiment, the buffer memory 118 may be included in the memory controller 110 but may be disposed outside the memory controller 110. Also, in FIG. 2, only one buffer memory 118 is shown, but example embodiments are not limited thereto, and the memory controller 110 may include two or more buffer memories. This is described below with reference to FIG. 5.

The host interface 119a may transmit packets to and receive packets from the host HOST. A packet transmitted from the host HOST to the host interface 119a may include a command or data to be written to the memory device 120, and a packet transmitted from the host interface 119a to the host HOST may include a response to the command or data read from the memory device 120.

The memory interface 119b may transmit data to be written in the memory device 120 to the memory device 120 or may receive data read from the memory device 120. The memory interface 119b may be implemented to comply with a standard protocol, such as Toggle or ONFI.

Figure 3:
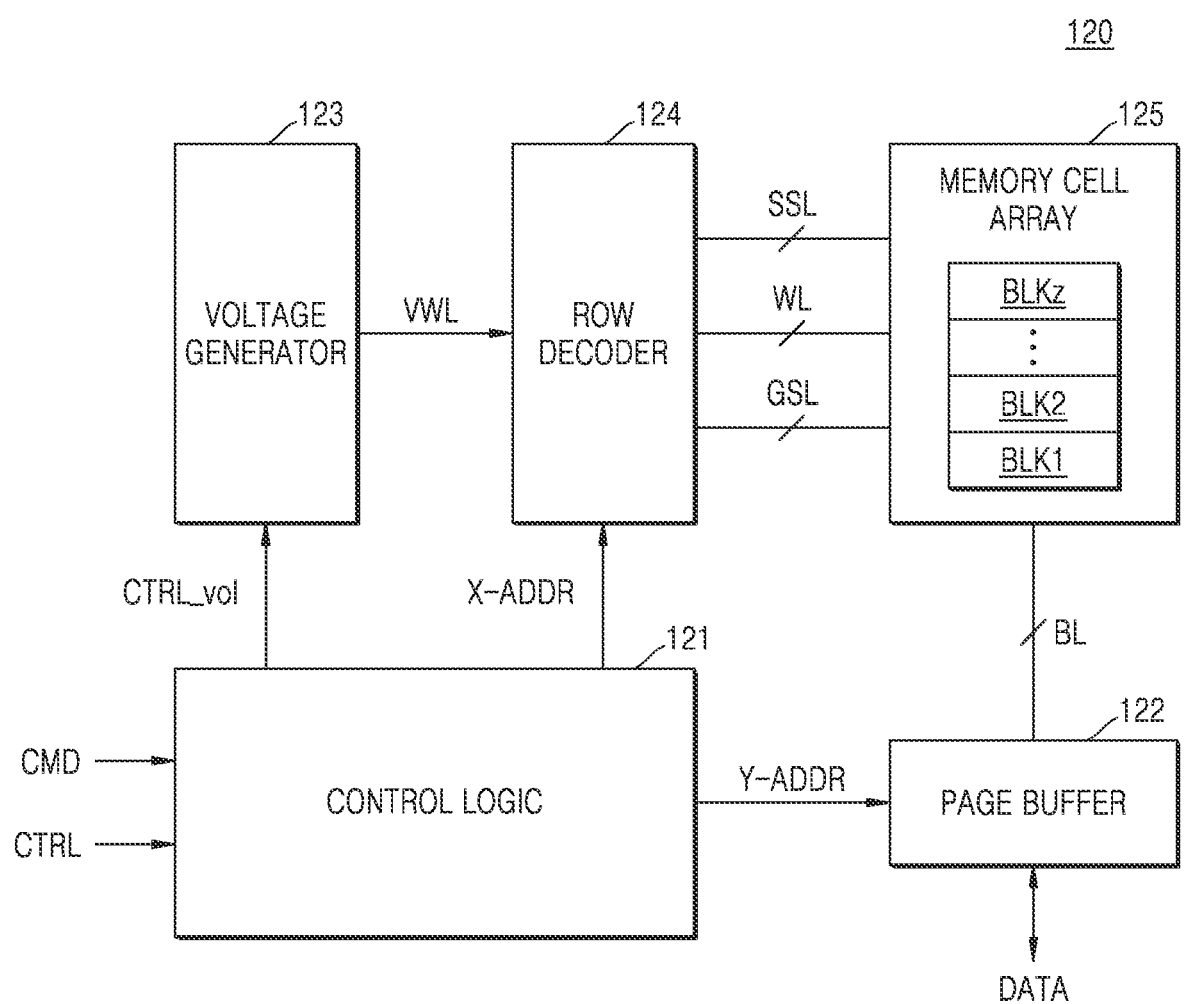
FIG. 3 is a block diagram illustrating a memory device according to an example embodiment.

FIG. 3 is a block diagram illustrating the memory device 120 according to an example embodiment.

Referring to FIG. 3, the memory device 120 may include a control logic 121, a page buffer 122, a voltage generator 123, a row decoder 124, and a memory cell array 125. The memory device 120 may further include various other components related to memory operations, such as a data input/output circuit or an input/output interface.

The control logic 121 may output various internal control signals for programing data into the memory cell array 125 or reading data from the memory cell array 125 based on a command CMD, an address ADDR, and a control signal CTRL received from the memory controller 110. For example, the control logic 121 may output a voltage control signal CTRL_vol for controlling levels of various voltages generated by the voltage generator 123. The control logic 121 may provide a row address X-ADDR to the row decoder 124 and provide a column address Y-ADDR to the page buffer 122.

The page buffer 122 may operate in response to the control of the control logic 121. For example, the page buffer 122 may operate as a write driver or a sense amplifier. In an example embodiment, during a program operation, the page buffer 122 may operate as a write driver to apply a voltage according to data DATA to be stored in the memory cell array 125 to bit lines BL. In an example embodiment, during a read operation, the page buffer 122 may operate as a sense amplifier to sense data DATA stored in the memory cell array 125.

The voltage generator 123 may generate various voltages used in the memory device 120, for example, the voltage generator 123 may generate a program voltage, a read voltage, a program verify voltage, an erase voltage, or the like as a word line voltage VWL.

The row decoder 124 may select at least one of word lines of the selected memory block in response to the row address X-ADDR.

The memory cell array 125 may include a plurality of memory cells and may be connected to word lines WL, string select lines SSL, ground select lines GSL, and bit lines BL. The memory cell array 125 may be connected to the row decoder 124 through the word lines WL, the string select lines SSL, and the ground select lines GSL, and may be connected to the page buffer 122 through the bit lines BL.

For example, the plurality of memory cells included in the memory cell array 125 may be non-volatile memory cells that keep stored data even when power thereto is cut off. Specifically, when the memory cell is a non-volatile memory cell, the memory device 120 may include electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), or ferroelectric random access memory (FRAM). Hereinafter, examples are described in which a plurality of memory cells are NAND flash memory cells, but example embodiments are not limited thereto.

The memory cell array 125 may include a plurality of memory blocks BLK1 to BLKz, and each of the memory blocks BLK1 to BLKz may have a planar structure or a three-dimensional structure. The memory cell array 125 may include at least one of a single-level cell block including single-level cells SLCs, a multi-level cell block including multi-level cells MLCs, a triple-level cell block including triple level cells TLC, and a quad level cell block including quad level cells. For example, some memory blocks among the plurality of memory blocks BLK1 to BLKz may be single-level cell blocks, and other memory blocks may be multi-level cell blocks, triple-level cell blocks, or quad-level cell blocks.

Figure 4:
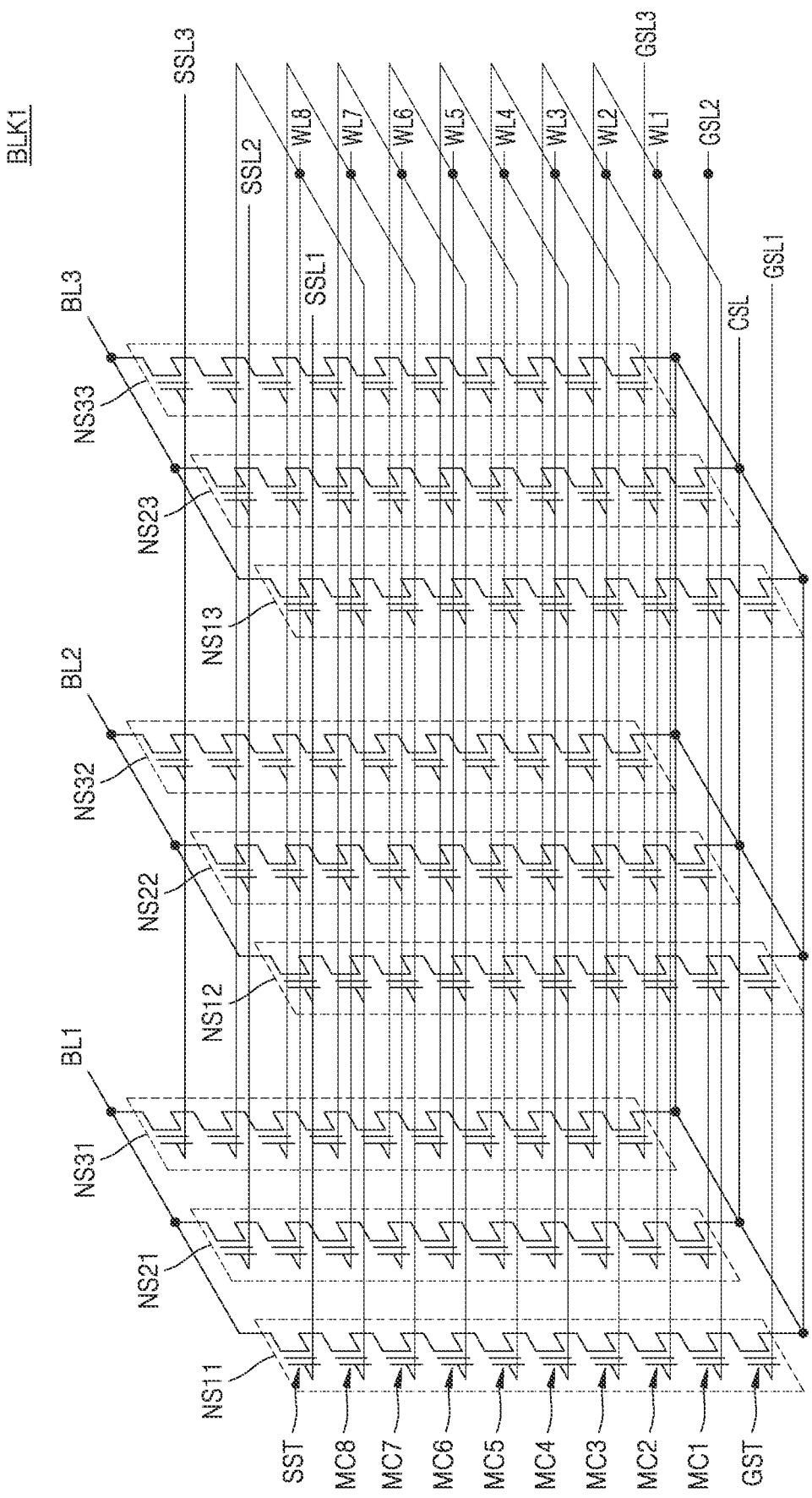
FIG. 4 is a circuit diagram illustrating a memory block according to an example embodiment.

FIG. 4 is a circuit diagram showing an equivalent circuit of the first memory block BLK1 of FIG. 3. FIG. 4 will be described with reference to FIG. 3, and redundant description may be omitted.

Referring to FIG. 4, the first memory block BLK1 may be a NAND flash memory having a vertical structure, and each of the memory blocks BLK1 to BLKz shown in FIG. 3 may be implemented as shown in FIG. 4. The first memory block BLK1 includes a plurality of NAND cell strings NS11 to NS33, a plurality of word lines WL1 to WL8, a plurality of bit lines BL1 to BL3, a plurality of ground select lines GSL1 to GSL3, a plurality of string select lines SSL1 to SSL3, and a common source line CSL. Here, the number of NAND cell strings, the number of word lines, the number of bit lines, the number of ground select lines, and the number of string select lines may be variously changed according to example embodiments.

The NAND cell strings NS11, NS21, and NS31 are provided between the first bit line BL1 and the common source line CSL, the NAND cell strings NS12, NS22, and NS32 are provided between the second bit line BL2 and the common source line CSL, and the NAND cell strings NS13, NS23, and NS33 are provided between the third bit line BL3 and the common source line CSL. Each NAND cell string (e.g., NS11) may include a string select transistor SST, a plurality of memory cells MC1 to MC8, and a ground select transistor GST connected in series.

The NAND cell strings commonly connected to one bit line may constitute one column. For example, the NAND cell strings NS11, NS21, and NS31 commonly connected to the first bit line BL1 may correspond to a first column, the NAND cell strings NS12, NS22, and NS32 commonly connected to the second bit line BL3 may correspond to a second column, and the NAND cell strings NS13, NS23, and NS33 commonly connected to the third bit line BL3 may correspond to a third column.

The NAND cell strings connected to one string select line may constitute one row. For example, the NAND cell strings NS11, NS12, and NS13 connected to the first string select line SSL1 may correspond to a first row, the NAND cell strings NS21, NS22, and NS23 connected to the second string select line SSL2 may correspond to a second row, and the NAND cell strings NS31, NS32 and NS33 connected to the third string select line SSL3 may correspond to a third row.

The string select transistor SST may be connected to corresponding string select lines SSL1 to SSL3. The plurality of memory cells MC1 to MC8 may be connected to corresponding word lines WL1 to WL8, respectively. The ground select transistors GST may be connected to corresponding ground select lines GSL1 to GSL3, and the string select transistors SST may be connected to corresponding bit lines BL1 to BL3. The ground select transistor GST may be connected to the common source line CSL.

In an example embodiment, the word lines (e.g., WL1) of the same height are commonly connected, the string select lines SSL1 to SSL3 are separated from each other, and the ground select lines GSL1 to GSL3 are also separated from each other. For example, when programming memory cells connected to the first word line WL1 and included in the NAND cell strings NS11, NS12, and NS13 corresponding to the first column, the first word line WL1 and the first string select line SSL1 are selected. However, example embodiments are not limited thereto, and in another example embodiment, the ground select lines GSL1 to GSL3 may be commonly connected.

In an example embodiment, each word line may be referred to as a memory page or a page. For example, the first word line WL1 may be referred to as a first memory page or a first page. Hereinafter, a physical address corresponding to each memory page may be referred to as a physical address of a word line.

Figure 5:
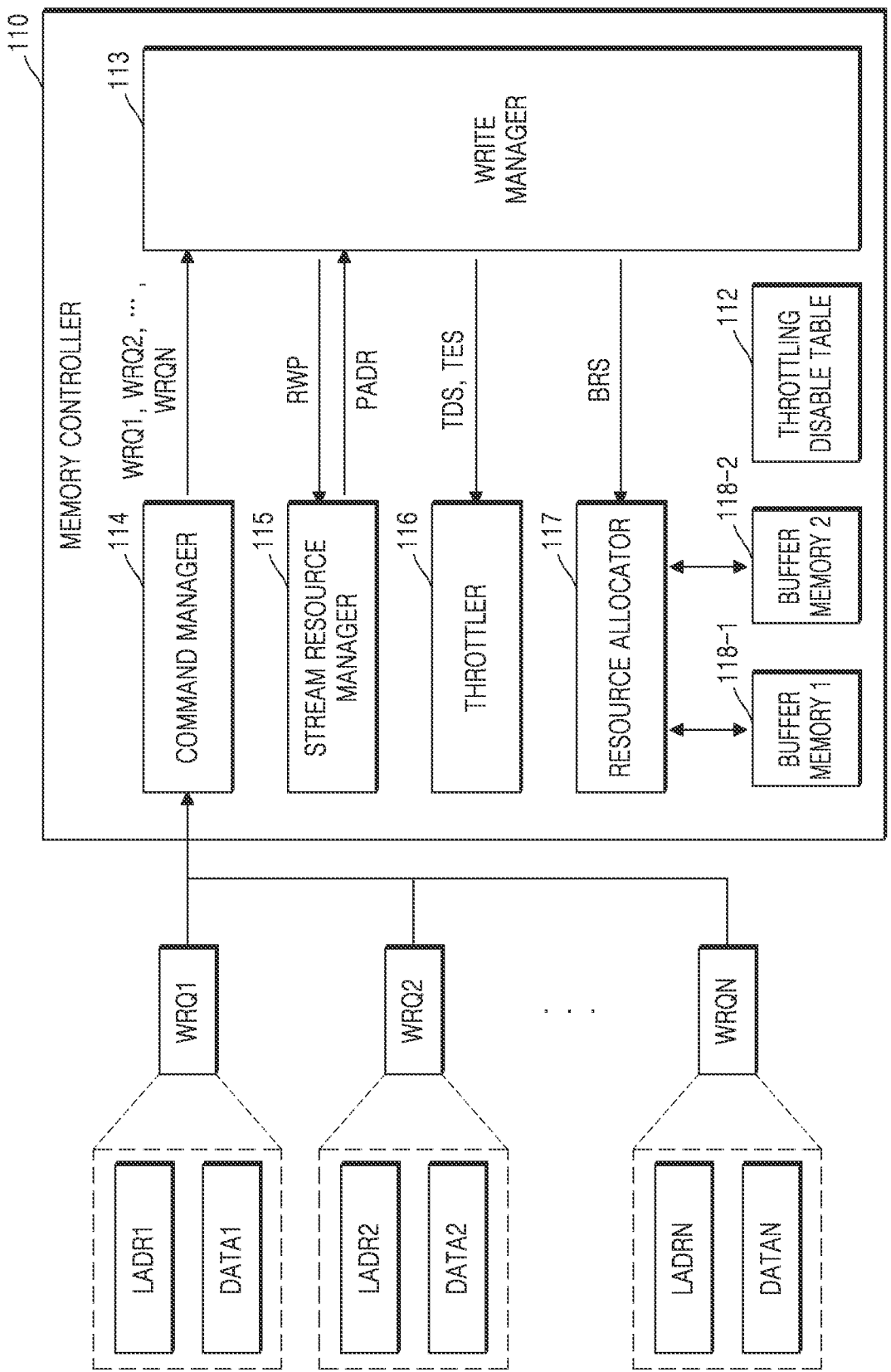
FIG. 5 is a block diagram illustrating a memory controller according to an example embodiment.

FIG. 5 is a block diagram illustrating a memory controller 110 according to an example embodiment. FIG. 5 will be described with reference to FIGS. 1 and 2, and descriptions previously given may be omitted.

The memory controller 110 may include a throttling disable table 112, a write manager 113, a command manager 114, a stream resource manager 115, a throttler 116, a resource allocator 117, a first buffer memory 118-1, and a second buffer memory 118-2. In an example embodiment, the two buffer memories shown in FIG. 5 are examples, and fewer or more buffer memories may be included.

The throttling disable table 112 may include information indicating throttling disable word lines. In an example embodiment, when a first physical address corresponding to the first logical address LADR1 included in the first write request WRQ1 received from the host corresponds to one of the throttling disable word lines indicated by the throttling disable table 112, the write manager 113 may inactivate the throttling operation by controlling the throttler 116 to adjust the throttling level.

The write manager 113 may control all write operations of the memory controller 110 for the memory device 120. The write manager 113 may receive N write requests (WRQ1, WRQ2, . . . , WRQN) from the command manager 114 (where N is a natural number greater than 1). The write manager 113 may transmit an address translation request signal (RWP) to the stream resource manager 115 based on a logical address included in the write request received from the command manager 114, and in response thereto, may receive a physical address (PADR) where data is to be written from the stream resource manager 115. When it is necessary to control the throttling operation by adjusting the throttling level, the write manager 113 may transmit a throttling disable signal TDS or a throttling resume signal TES to the throttler 116. When the throttling operation is inactivated, the write manager 113 may control the resource allocator 117 so that a buffer memory for the write operation is changed from a first buffer memory 118-1 to a second buffer memory 118-2. Similarly, when the throttling operation is resumed, the write manager 113 controls the resource allocator 117 so that the buffer memory for the write operation is changed from the second buffer memory 118-2 to the first buffer memory 118-1.

The command manager 114 may receive write requests WRQ1, WRQ2, . . . , WRQN from the host HOST. In an example embodiment, each write request may include data to be written to the memory device 120 and a logical address. For example, the first write request WRQ1 may include first data DATA1 and the first logical address LADR1, the second write request WRQ2 may include second data DATA2 and the second logical address LADR2, and the Nth write request WRQN may include Nth data DATAN and Nth logical address LADRN.

The stream resource manager 115 may receive an address translation request signal RWP from the write manager 113. The address translation request signal RWP may include a logical address included in a write request received from the host HOST. The stream resource manager 115 may receive a logical address included in the write request and may transmit a physical address corresponding to the received logical address to the write manager 113. In an example embodiment, when the write manager 113 receives a first write request (WRQ1) from the command manager 114, the write manager 113 may transmit the address translation request signal RWP including the first logical address LADR1 to the stream resource manager 115. Accordingly, the stream resource manager 115 may transmit a physical address PADR (e.g., the first physical address) corresponding to the first logical address LADR1 to the write manager 113.

The throttler 116 may adjust a throttling level based on a throttling disable signal TDS or a throttling resume signal TES of the write manager 113.

In an example embodiment, when the throttler 116 receives a throttling disable signal TDS from the write manager 113, the performance of the throttling operation may be prohibited by increasing the throttling level or inactivating the throttling level. Hereinafter, the disabling of the throttling level may be referred to as removing the limitation of bandwidth by removing the throttling level. For example, when the throttling level is previously set to a first value, a bandwidth when the storage device 100 performs a write operation according to a request from the host HOST may not exceed the first value. However, if the throttling level is adjusted to a second value that is greater than the first value by the throttler 116, the bandwidth when the storage device 100 performs a write operation according to the request of the host HOST may exceed the first value. In this case, the bandwidth may be less than the second value. As another example, when the throttling level is inactivated by the throttler 116, the bandwidth may have a maximum allowable bandwidth value of the storage device 100 exceeding the first value.

In an example embodiment, when the throttler 116 receives a throttling resume signal TES from the write manager 113, the throttler 116 may reset the throttling level. For example, when the throttling level previously set to the first value is inactivated by the throttling disable signal TDS and the throttle 116 receives a throttling resume signal TES, the throttle 116 may set the throttling level back to the first value. Accordingly, the bandwidth when the storage device 100 performs a write operation according to the request of the host HOST may once again be limited by not exceed the first value.

The resource allocator 117 may receive a buffer allocation signal BRS from the write manager 113. The resource allocator 117 may operate based on the received buffer allocation signal BRS to determine which memory buffer to allocate to perform the write operation when performing a write operation for the memory device 120. In an example embodiment, when the throttling operation is inactivated by the throttler 116, the write manager 113 may control the resource allocator 117 so that a buffer memory performed in the write operation is changed from the first buffer memory 118-1 to the second buffer memory 118-2. Similarly, when the throttling operation is resumed by the throttler 116, the write manager 113 controls the resource allocator 117 so that the buffer memory used in the write operation is changed from the second buffer memory 118-2 to the first buffer memory 118-1. In an example embodiment, the resource allocator 117 may control both the first buffer memory 118-1 and the second buffer memory 118-2 to be allocated to a write operation. In an example embodiment, the first buffer memory 118-1 may be configured to include DRAM, and the second buffer memory 118-2 may be a memory capable of inputting and outputting data at a higher speed than the first buffer memory 118-1. For example, the second buffer memory 118-2 may be configured to include SRAM.

Figure 6:
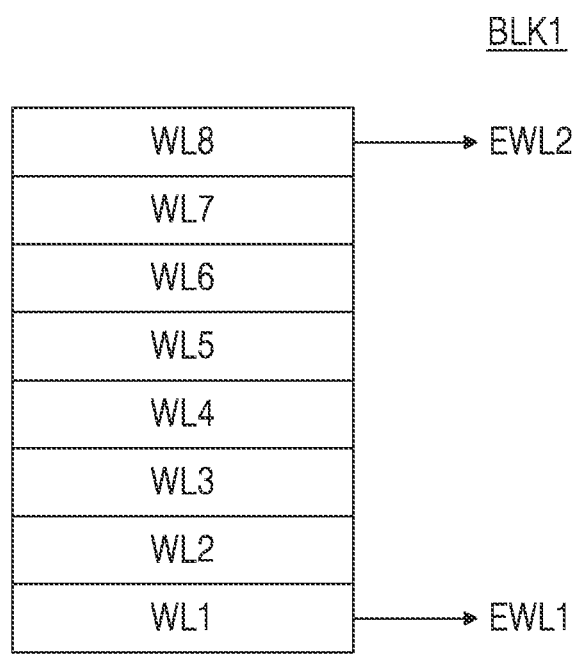
FIG. 6 is a block diagram illustrating a case in which a memory controller performs an erase operation before writing to a memory block according to an example embodiment.

FIG. 6 is a block diagram for describing a case in which the memory controller 110 performs an erase operation before writing to a memory block according to an example embodiment. In detail, FIG. 6 is a diagram for explaining a case when write and erase operations are performed for the first memory block BLK1 included in the memory cell array 125 of FIG. 3. FIG. 6 will be described with reference to FIGS. 1, 2, and 5, and descriptions previously given may be omitted.

Referring to FIG. 6, the first memory block BLK1 is an example, and the same operation may be performed on the second memory block BLK2 to the z-th memory block BLKz. The first memory block BLK1 may include a first word line WL1 to an eighth word line WL8. The outermost word lines of the first memory block BLK1, that is, the first word line WL1 and the eighth word line WL8 may be referred to as edge word lines. Hereinafter, the first word line WL1 may be referred to as a first edge word line EWL1, and the eighth word line WL8 may be referred to as a second edge word line EWL2. Due to characteristics occurring in a semiconductor process, when a write operation is performed on the first edge word line EWL1 and the second edge word line EWL2, a bandwidth value that is greater than bandwidth values when a write operation is performed on other word lines (e.g., the third word line WL3 to the seventh word line WL7) may be measured.

In an example embodiment, when a write operation is performed on the first edge word line EWL1 and the second edge word line EWL2, the write manager 113 may transmit a buffer allocation signal BRS to the resource allocator 117 to request allocation of a buffer memory. For example, when a write operation is being performed through the first buffer memory 118-1, the write manager 113 may request the allocation of the second buffer memory 118-2 to perform a write operation through the second buffer memory 118-2.

In an example embodiment, a write operation may be performed on at least one word line among the first word line WL1 to the eighth word line WL8 of the first memory block BLK1 according to a write request from the host HOST. At this time, when data has already been written in the first to eighth word lines WL1 to WL8, an erase operation may be required. Specifically, an erase operation on the first memory block BLK1 may be needed before performing a write operation on the first memory block BLK1 according to a write request from the host HOST. Accordingly, a bandwidth when performing a write operation for the first memory block BLK1 may rapidly decrease. Therefore, the memory controller 110 adjusts a throttling level before the erase operation that precedes the write operation for the first memory block BLK1 is performed, and thus, a bandwidth limitation due to the throttling operation may be temporarily inactivated. The memory controller 110 may allow a storage device to perform the throttling operation by adjusting the throttling level again when the write operation is completed after the erase operation.

Figure 7:
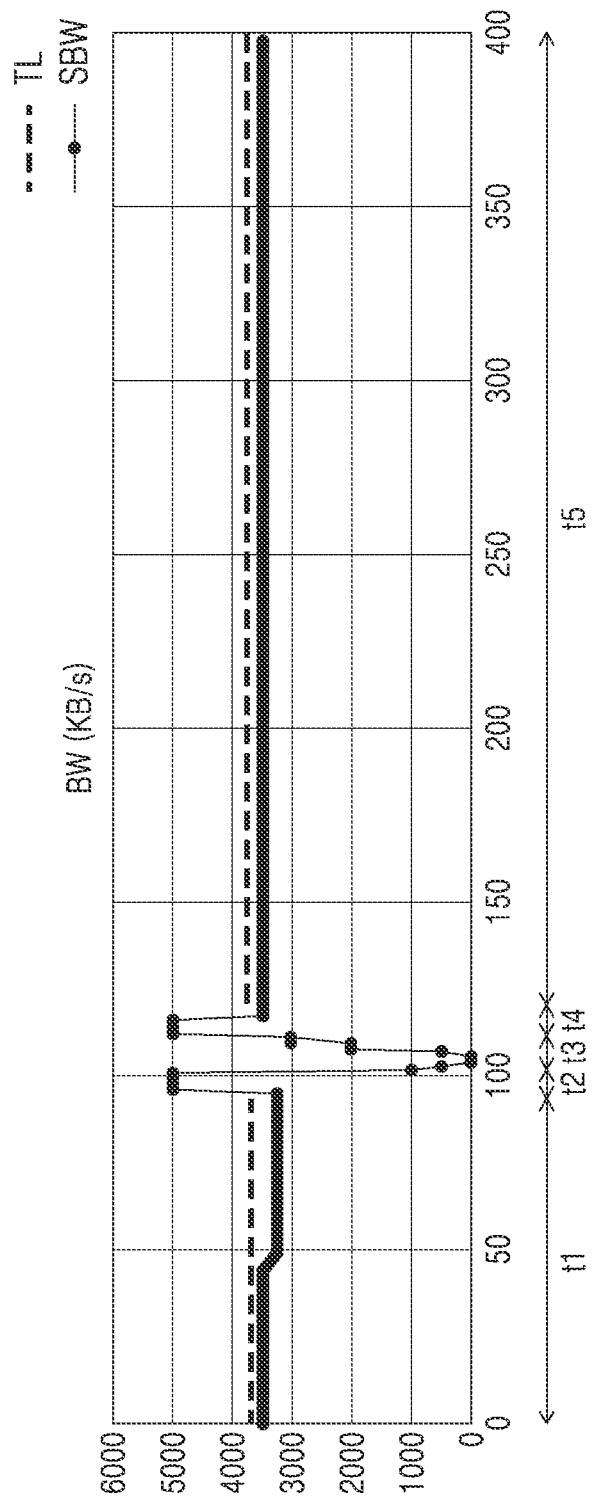
FIG. 7 is a diagram illustrating a bandwidth of a storage device according to an example embodiment.

FIG. 7 is a diagram illustrating a bandwidth of the storage device 100 according to an example embodiment. Specifically, FIG. 7 is a diagram for explaining the mitigation of reducing the bandwidth when an erase operation is performed before a write operation for the first memory block BLK1 of FIG. 6 by the memory controller 110. FIG. 7 will be described with reference to FIGS. 1, 2, 5, and 6, and descriptions previously given may be omitted.

The graph shown in FIG. 7 is a graph for representing bandwidth measured when the memory controller 110 performs a write operation on the memory device 120 according to a request from the host HOST. The vertical axis of the graph of FIG. 7 represents bandwidth in KB/s unit, and the horizontal axis represents time in millisecond (ms) unit. When a write operation is performed, the bandwidth SBW may be less than a throttling level TL due to an already set throttling level TL. For example, the bandwidth SBW in the first time period t1 and the fifth time period t5 may be less than the throttling level TL.

In an example embodiment, when data is written in the first memory block BLK1 according to a request of the host HOST, before performing a write operation on the first memory block BLK1, it is assumed that an erase operation on the first memory block BLK1 should precede the write operation and the memory controller 110 receives a write request signal from the host HOST before entering a second time period t2.

The first time period t1 may denote a time before write and erase operations on the first memory block BLK1 are performed. In the first time period t1, a buffer memory used during a write operation on the first memory block BLK1 may be the first buffer memory 118-1. Before entering the second time period t2 in which the erase operation on the first memory block BLK1 is performed, the memory controller 110 may adjust a throttling level TL. That is, by temporarily inactivating the throttling level TL, and the throttling operation may not be performed even if the memory controller 110 performs the write operation. Before entering the second time period t2, the memory controller 110 may allocate a buffer used as a write buffer to a buffer operating at a higher speed. For example, even if the write operation is performed through the first memory buffer 118-1 in the first time period t1, the memory controller 110 may allocate a buffer memory to perform a write operation through the second memory buffer 118-2 in the second to fourth time periods t2 to t4.

In the second time period t2, erase and write operations may be performed while the throttling level TL is inactivated. The write operation may be performed through the second memory buffer 118-2, which performs data input/output at a higher speed than the first memory buffer 118-1, and the write operation for the edge word line EWL having a faster bandwidth than other word lines may be performed first, thus, the bandwidth may increase. When the capacity of the second memory buffer 118-2 is exceeded, the write operation may not be performed until the erase operation on the first memory block BLK1 is completed, and thus, the bandwidth SBW may decrease again.

In the third time period t3, after the erase operation is completed, the write operation may resume. At this time, because the throttling level TL may still be in an inactive state and the write operation is performed through the second memory buffer 118-2 performing data input/output at a higher speed than the first memory buffer 118-1, the bandwidth SBW may increase.

In the fourth time period t4, the writing operation may be completed. Specifically, while the throttling level TL is still in an inactivated state, the write operation is performed through the second memory buffer 118-2, and the fourth time period t4 is a time period in which a write operation is performed on the second edge word line EWL2 having a bandwidth faster than that of other word lines, and thus, the bandwidth SBW may have a large value exceeding the throttling level TL. After the write operation is completed, the memory controller 110 may reset the throttling level TL.

In the fifth time period t5, after the write operation is completed, the storage device 100 may again perform a write operation in a state of not exceeding the throttling level TL. Accordingly, the bandwidth SBW may not exceed the throttling level TL in the fifth time period t5.

Figure 8:
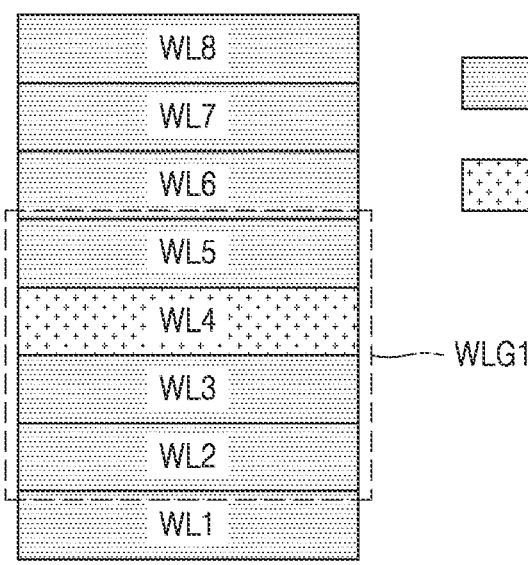
FIG. 8 is a block diagram illustrating a case in which a memory controller performs a write operation on a specific word line of a memory block according to an example embodiment.

FIG. 8 is a block diagram illustrating a case in which the memory controller 110 performs a write operation on a specific word line of a memory block according to an example embodiment. In detail, FIG. 8 is a diagram for explaining disabling of a throttling operation when a write operation is performed on a word line corresponding to a physical address indicated by the throttling disable table. FIG. 8 will be described with reference to FIGS. 1, 2, 3, and 5, and descriptions previously given may be omitted.

Referring to FIG. 8, the first memory block BLK1 may include a first word line WL1 to an eighth word line WL8. The first memory block BLK1 of FIG. 8 may correspond to the first memory block BLK1 of FIG. 3. Hereinafter, it is assumed that a write operation is performed on the first word line group WLG1 including the second word line WL2 to the fifth word line WL5. In FIG. 8, it is assumed that a bandwidth of a write operation performed on a fourth word line WL4 among word lines included in the first word line group WLG1 is less than a bandwidth of a write operation performed on other word lines. That is, the fourth word line WL4 may be a throttling-inactivated word line, and a bandwidth during a write operation on the fourth word line WL4 may be less than or equal to a reference value. Accordingly, information indicating the physical address corresponding to the fourth word line WL4 is included in the throttling disable table 112. It is illustrated that the first word line group WLG1 includes four word lines but fewer or more word lines may be included in the first word line group WLG1.

In an example embodiment, when a write operation is performed on the first word line group WLG1 at a request of the host HOST, the write manager 113 may determine whether a physical address corresponding to word lines belonging to the first word line group WLG1 is indicated by the throttling disable table 112. Because the physical address corresponding to the fourth word line WL4 is indicated by the throttling disable table 112 in this example, the write manager 113 may control the throttler 116 to adjust the throttling level. The write manager 113 may control the throttling level to be inactivated by transmitting a throttling disable signal TDS to the throttler 116 before a write operation on the first word line group WLG1 is performed.

The write manager 113 may transmit a buffer allocation signal BRS to the resource allocator 117 so that a buffer memory used in the write operation is changed from the first buffer memory 118-1 to the second buffer memory 118-2. Accordingly, when a write operation is performed on the first word line group WLG1, the throttling level may be inactivated. Because the throttling level is inactivated, the memory controller 110 may not perform a throttling operation even when the write operation is performed on the memory device 120. In addition, because the buffer used in the write operation is changed to the second buffer memory 118-2, even if the bandwidth decreases during the write operation for the fourth word line WL4, a bandwidth with respect to the second word line WL2, the third word line WL3, and the fifth word line WL5 may increase during a write operation. Accordingly, an average bandwidth of the entire first word line group WLG1 may be consistently maintained.

Figure 9:
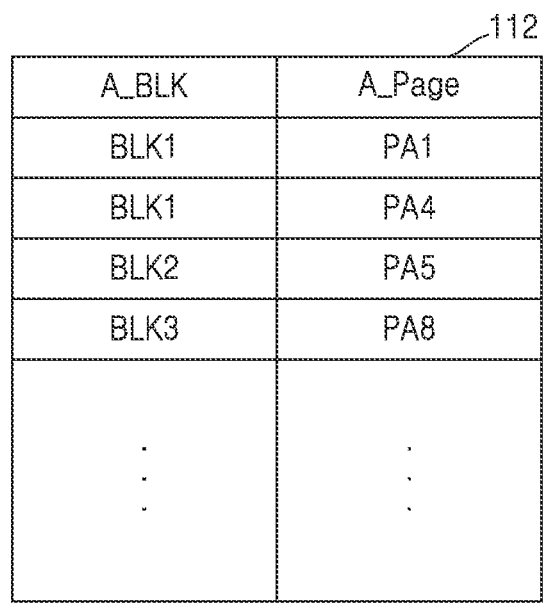
FIG. 9 is a diagram for explaining a throttling disable table according to an example embodiment.

FIG. 9 is a diagram for explaining a throttling disable table 112 according to an example embodiment.

The throttling disable table 112 may include information indicating throttling disable word lines. For example, the throttling disable table 112 may include information (A_Page) on physical addresses of memory pages corresponding to throttling disable word lines and information (A_BLK) on a memory block including a memory page. In FIG. 9, as an example, it is depicted that the throttling disable table 112 includes information indicating four throttling disable word lines, but the throttling disable table 112 may include information indicating fewer or more throttling disable word lines.

In an example embodiment, the throttling disable table 112 may include a physical address PA1 corresponding to a first word line of a first memory block BLK1. The throttling disable table 112 may include a physical address PA4 corresponding to a fourth word line of the first memory block BLK1. The throttling disable table 112 may include a physical address PA5 corresponding to a fifth word line of a second memory block BLK2. The throttling disable table 112 may include a physical address PA8 corresponding to an eighth word line of a third memory block BLK3.

Figure 10:
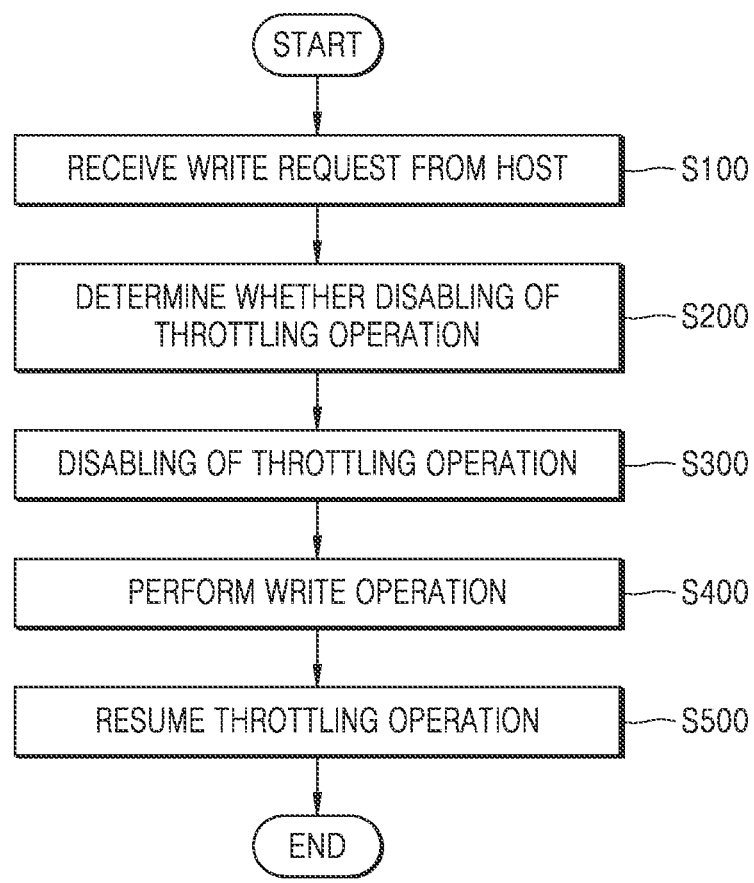
FIG. 10 is a flowchart illustrating a method of operating a memory controller according to an example embodiment.

FIG. 10 is a flowchart illustrating an operating method of the memory controller 110 according to an example embodiment. In detail, FIG. 10 is a diagram for explaining a method of maintaining consistency of a bandwidth during a write operation by selectively performing a throttling operation by the memory controller 110 of FIG. 5. FIG. 10 will be described with reference to FIGS. 1, 2, and 5, and descriptions previously given may be omitted.

In operation S100, the memory controller 110 may receive a write request from the host HOST. In an example embodiment, the write request may include data to be written into the memory device 120 and a logical address.

In operation S200, the memory controller 110 may determine whether to inactivate a throttling operation. In an example embodiment, whether an erase operation is required before performing a write operation on the memory device 120 in response to a write request or whether a physical address corresponding to a logical address included in a write request is included in the throttling disable table 112 may be determined.

In operation S300, when the throttling disable is determined in operation S200, the memory controller 110 may inactivate the throttling operation by adjusting a throttling level. Therefore, even if the memory controller 110 performs a write operation on the memory device 120, data may be written with a bandwidth exceeding the throttling level. If it is determined to continue performing the throttling operation in operation S200, operation S300 may be omitted.

In operation S400, the memory controller 110 may perform a write operation corresponding to a write request from the host HOST to the memory device 120.

In operation S500, when the throttling disable is determined in operation S200, the memory controller 110 may maintain consistency of a bandwidth of the memory device 120 by restarting the throttling operation. If it is determined to continue performing the throttling operation in operation S200, operation S500 may be omitted.

Figure 11:
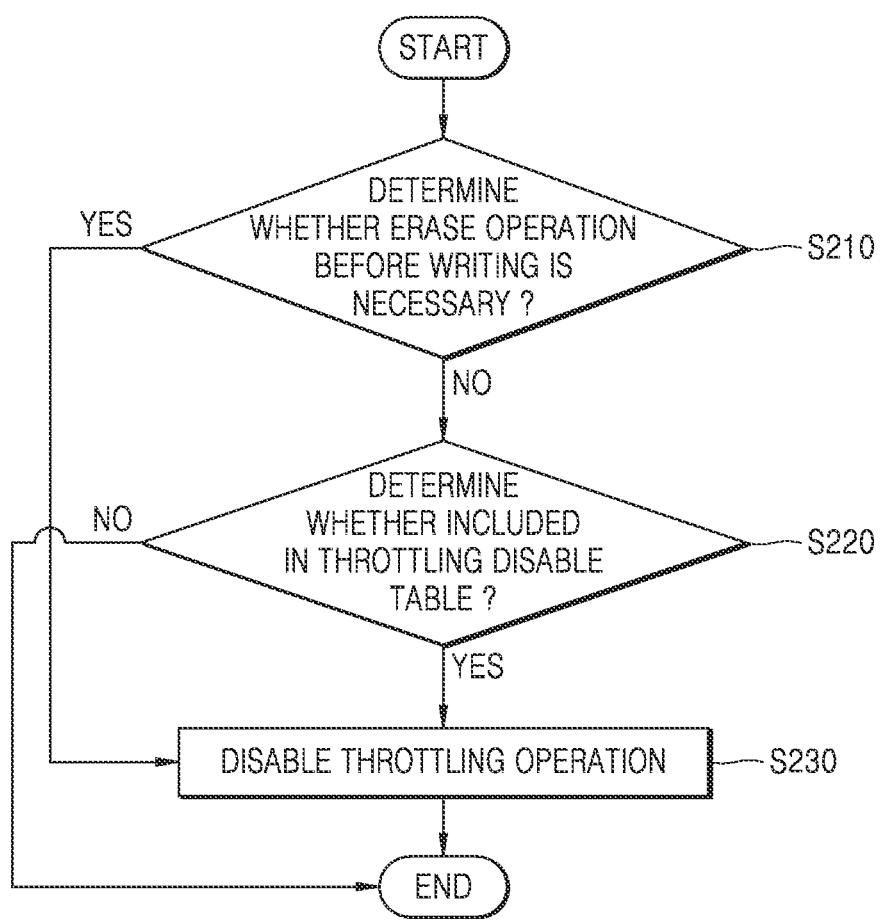
FIG. 11 is a flowchart illustrating a method of determining whether to disable a throttling operation, according to an example embodiment.

FIG. 11 is a flowchart illustrating a method of determining whether to inactivate a throttling operation, according to an example embodiment. Specifically, FIG. 11 is a flowchart for explaining operation S200 of FIG. 10.

In operation S210, the memory controller 110 may determine whether an erase operation is required when performing a write operation in response to a request from the host HOST. That is, the memory controller 110 may determine whether a memory block on which a write operation is to be performed is a memory block to be erased. For example, when data is already written in the first memory block BLK1, it is necessary to perform a write operation on the first memory block BLK1 included in the memory device 120 before the write operation is performed. Therefore, the first memory block BLK1 may be erased and a write operation may be performed.

In operation S220, the memory controller 110 may determine whether a physical address corresponding to a word line on which data is to be written is included in the throttling disable table 112 or not when performing a write operation in response to a request from the host HOST. For example, if it is determined in operation S210 that the erase operation on the memory block is not needed, the memory controller 110 may determine whether or not a physical address corresponding to a logical address included in a request from the host HOST is included in the throttling disable table 112.

In operation S230, when it is determined in operation S210 that an erase operation is required for the memory block on which data is to be written or, in operation S220, when a physical address corresponding to a word line on which data is to be written is included in the throttling disable table 112, the memory controller 110 may disable the throttling operation by adjusting a throttling level.

Figure 12:
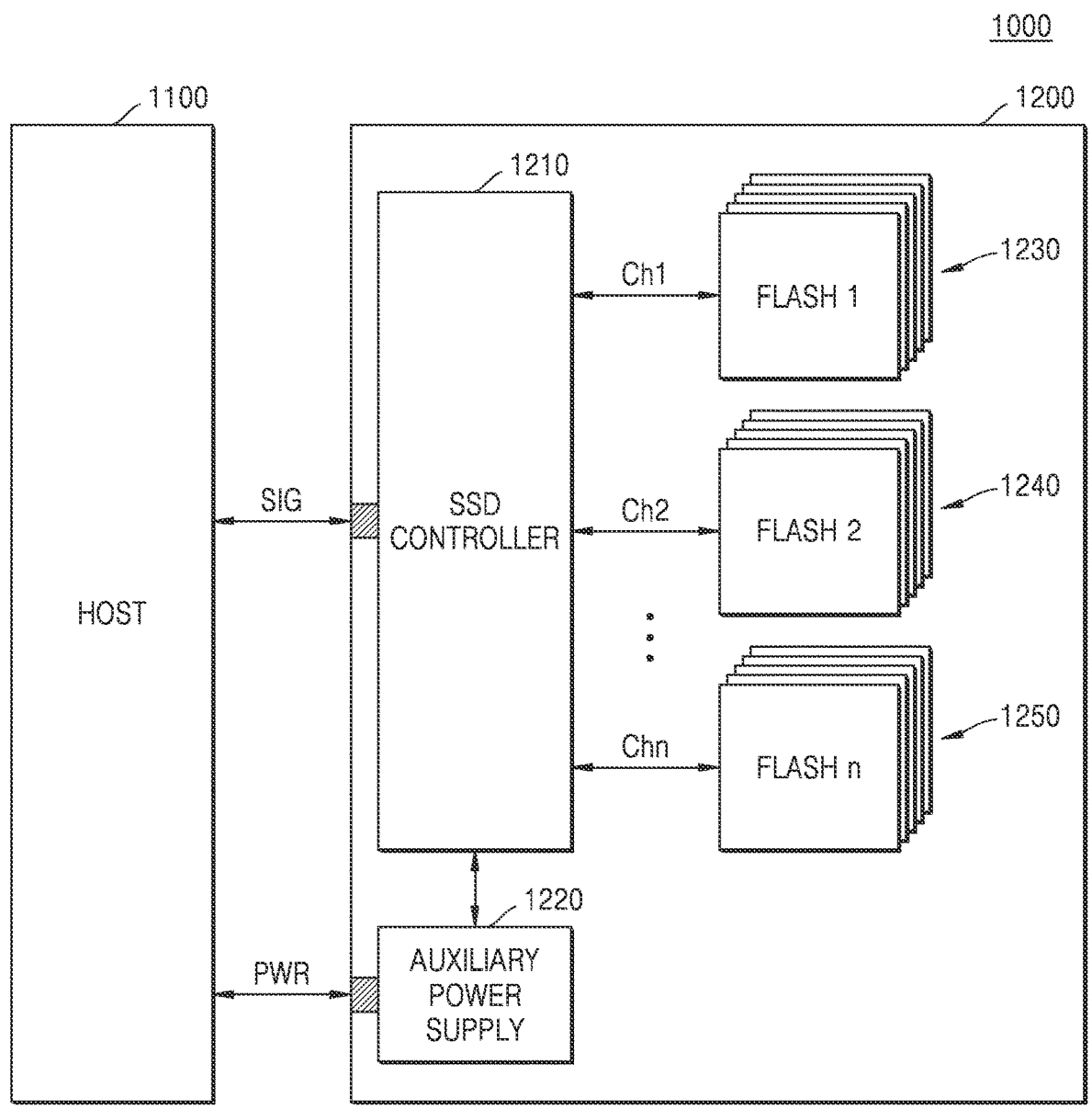
FIG. 12 is a block diagram illustrating an example of applying a memory controller to a solid state drive (SSD) system, according to an example embodiment.

FIG. 12 is a block diagram illustrating an example of applying a memory controller according to an example embodiment to an SSD system 1000.

Referring to FIG. 12, the SSD system 1000 may include a host 1100 and an SSD 1200. The SSD 1200 may exchange signals with the host 1100 through a signal connector SIG and receive power through a power connector PWR. The SSD 1200 may include an SSD controller 1210, an auxiliary power supply 1220, and memory devices 1230, 1240, and 1250. At this time, the SSD 1200 may be implemented by using example embodiments described above with reference to FIGS. 1 to 11. Accordingly, the SSD controller 1210 may perform a write operation according to a request of the host 1100 and inactivate or resume a throttling operation by adjusting a throttling level before the write operation is performed. Through this operation, a bandwidth when the SSD controller 1210 performs a write operation on the memory devices 1230, 1240, and 1250 may be consistently maintained.

In some example embodiments, each of the components represented by a block as illustrated in FIGS. 1-3, 5 and 12 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A method of operating a memory controller including a throttling disable table indicating memory blocks, and word lines within the memory blocks having an input/output (I/O) bandwidth that is less than a reference value, as throttling disable word lines, the method comprising:
    receiving a write request from a host;
    determining whether to inactivate a throttling operation based on whether the write request corresponds to one of the throttling disable word lines indicated by the throttling disable table, and whether a memory block corresponding to the write request needs to be erased; and
    performing a write operation corresponding to the write request based on the determining.

2. The method of claim 1,
    wherein the throttling disable table indicates a physical addresses of memory pages corresponding to the word lines having the input/output (I/O) bandwidth that is less than the reference value.

3. The method of claim 2, wherein the determining comprises:
    determining to inactivate the throttling operation based on the write request corresponding to a physical address of a memory page corresponding to a word line indicated by the throttling disable table; and
    determining to inactivate the throttling operation based on the memory block corresponding to the write request needing to be erased.

4. The method of claim 1, wherein the performing comprises:
    inactivating the throttling operation based on determining to inactivate the throttling operation; and
    performing a write operation corresponding to the write request.

5. The method of claim 4, further comprising:
    based on the throttling being inactivated, re-activating the throttling operation after the write operation is completed.

6. The method of claim 1, wherein the write request includes data and a logical address corresponding to the data, and
    wherein the receiving the write request comprises receiving a physical address of a memory page corresponding to the logical address.

7. The method of claim 1, wherein the memory controller further includes a first buffer memory and a second buffer memory,
    wherein the performing the write operation comprises performing the write operation through the first buffer memory based on the throttling operation being activated and the second buffer memory based on the throttling operation being inactivated, and
    wherein the second buffer memory processes data at a higher speed than the first buffer memory.

8. The method of claim 7, further comprising performing a write operation through the second buffer memory while performing the write operation corresponding to the write request based on determining to inactivate the throttling operation,
    wherein the first buffer memory is configured of dynamic random-access memory (DRAM), and the second buffer memory is configured of static random access memory (SRAM).

9. A memory controller comprising:
    a memory storing a throttling disable table indicating memory blocks, and word lines within the memory blocks having an input/output (I/O) bandwidth that is less than a reference value, as throttling disable word lines;
    a processor configured to control:
        a command manager to receive a write request from a host;
        a write manager to determine whether to inactivate a throttling operation based on whether the write request corresponds to one of the throttling disable word lines indicated by the throttling disable table, and whether a memory block corresponding to the write request needs to be erased; and
        control a write operation corresponding to the write request based on whether the write manager determines to inactivate the throttling operation.

10. The memory controller of claim 9,
    wherein the throttling disable table indicates a physical addressees of memory pages corresponding to the word lines having the input/output (I/O) bandwidth that is less than the reference value.

11. The memory controller of claim 10, wherein the processor is further configured to control the write manager to determine to inactivate the throttling operation based on the write request corresponding to a physical address of a memory page corresponding to a word line indicated by the throttling disable table.

12. The memory controller of claim 9, wherein the processor is further configured to control the write manager to determine to inactivate the throttling operation based on the memory block corresponding to the write request needing to be erased.

13. The memory controller of claim 9,
    wherein the processor is further configured to:
        inactivate the throttling operation by controlling a throttler when inactivating the throttling operation; and control the write manager to perform a write operation corresponding to the write request.

14. The memory controller of claim 9, wherein the processor is further configured to control, after the write operation is completed, the write manager to re-activate the throttling operation.

15. The memory controller of claim 9, wherein the write request includes data and a logical address corresponding to the data, and
    wherein the processor is further configured to control a stream resource manager to receive a physical address of a memory page corresponding to the logical address.

16. The memory controller of claim 9, further comprising:
    a first buffer memory; and
    a second buffer memory,
    wherein the processor is further configured to control the write operation to be performed through the first buffer memory based on the throttling operation being activated and the second buffer memory based on the throttling operation being inactivated, and
    wherein the second buffer memory is configured to process data at a higher speed than the first buffer memory.

17. The memory controller of claim 16, wherein the processor is further configured to control a resource allocator to, while performing the write operation, control the write operation to be performed through the second buffer memory, and
    wherein the first buffer memory is configured of dynamic random-access memory (DRAM), and the second buffer memory is configured of static random access memory (SRAM).

18. A storage device comprising:
    a memory storing a throttling disable table indicating memory blocks, and word lines within the memory blocks having an input/output (I/O) bandwidth that is less than a reference value, as throttling disable word lines;
    a memory device including a plurality of memory blocks; and
    a memory controller configured to receive a write request from a host, determine whether to inactivate a throttling operation based on whether the write request corresponds to one of the throttling disable word lines indicated by the throttling disable table, and whether a memory block corresponding to the write request needs to be erased, and perform a write operation corresponding to the write request based on whether it is determined to inactivate the throttling operation.

19. The storage device of claim 18,
    wherein the throttling disable table indicates a physical addresses of memory pages corresponding to the word lines having the input/output (I/O) bandwidth that is equal to or less than the reference value.

20. The storage device of claim 19, wherein the memory controller is further configured to:
    determine to inactivate the throttling operation based on the write request corresponding to a physical address of a memory page corresponding to a word line indicated by the throttling disable table; and
    determine to inactivate the throttling operation based on the memory block corresponding to the write request needing to be erased.

* * * * *